US006755458B1

(12) United States Patent
Oberheide

(10) Patent No.: US 6,755,458 B1
(45) Date of Patent: Jun. 29, 2004

(54) LIFTGATE FORCE CONTROL

(75) Inventor: G. Clarke Oberheide, Troy, MI (US)

(73) Assignee: Intier Automotive Closures Inc., Newmarket (CA)

( * ) Notice: Subject to any disclaimer, the term of this patent is extended or adjusted under 35 U.S.C. 154(b) by 0 days.

(21) Appl. No.: 10/381,822

(22) PCT Filed: Oct. 1, 2001

(86) PCT No.: PCT/CA01/01382

§ 371 (c)(1), (2), (4) Date: Mar. 28, 2003

(87) PCT Pub. No.: WO02/27133

PCT Pub. Date: Apr. 4, 2002

Related U.S. Application Data

(60) Provisional application No. 60/236,978, filed on Sep. 29, 2000.

(51) Int. Cl.[7] .................................................. B60J 5/02

(52) U.S. Cl. ........................ 296/146.8; 296/56; 296/76; 49/340

(58) Field of Search ................................ 296/146.8, 56, 296/76, 106, 100.1, 146.1, 146.11, 146.4, 50; 49/386, 340, 334; 180/69.21, 89.17; 292/DIG. 43; 267/64.26

(56) References Cited

U.S. PATENT DOCUMENTS

| | | | | | |
|---|---|---|---|---|---|
| 4,776,626 | A | * | 10/1988 | Seyler | 296/76 |
| 4,903,435 | A | | 2/1990 | Bittmann et al. | |
| 5,278,480 | A | | 1/1994 | Murray | |
| 5,448,856 | A | * | 9/1995 | Moore et al. | 49/340 |
| 5,531,498 | A | | 7/1996 | Kowall | |
| 5,588,258 | A | | 12/1996 | Wright et al. | |
| 5,836,050 | A | * | 11/1998 | Rumez et al. | 16/84 |
| 5,839,719 | A | | 11/1998 | Hosan et al. | |
| 5,851,050 | A | | 12/1998 | Squire et al. | |
| 5,896,703 | A | | 4/1999 | Wright et al. | |
| 5,921,604 | A | * | 7/1999 | Yu et al. | 296/146.8 |
| 5,982,126 | A | | 11/1999 | Hellinga et al. | |
| 6,055,776 | A | * | 5/2000 | Dettling et al. | 296/56 |
| 6,092,336 | A | | 7/2000 | Wright et al. | |
| 6,092,337 | A | * | 7/2000 | Johnson et al. | 296/146.8 |
| 6,115,965 | A | * | 9/2000 | Jennings | 49/340 |
| 6,142,551 | A | * | 11/2000 | Ciavaglia et al. | 296/146.8 |
| 6,145,917 | A | * | 11/2000 | Ishii et al. | 296/146.8 |
| 6,202,350 | B1 | | 3/2001 | Montgomery et al. | |
| 6,234,563 | B1 | * | 5/2001 | Bascou | 296/146.8 |
| 6,270,147 | B1 | * | 8/2001 | Butler et al. | 296/146.8 |
| 6,283,535 | B1 | * | 9/2001 | Yuge | 296/146.8 |
| 6,298,604 | B1 | * | 10/2001 | Rogers et al. | 296/146.8 |
| 6,318,025 | B1 | * | 11/2001 | Sedlak | 296/56 |
| 6,341,809 | B1 | * | 1/2002 | Chapman | 296/146.8 |
| 6,367,199 | B2 | * | 4/2002 | Sedlak et al. | 296/56 |
| 6,367,864 | B2 | * | 4/2002 | Rogers et al. | 296/146.4 |
| 6,382,706 | B2 | * | 5/2002 | Yuge et al. | 296/146.8 |
| 6,405,486 | B1 | * | 6/2002 | Rogers et al. | 296/146.8 |
| 6,425,205 | B2 | * | 7/2002 | Wygle et al. | 296/56 |
| 6,513,850 | B1 | * | 2/2003 | Reed | 296/57.1 |
| 6,520,557 | B2 | * | 2/2003 | Benthaus et al. | 296/146.4 |
| 6,550,839 | B2 | * | 4/2003 | Rogers et al. | 296/148.8 |
| 6,637,157 | B1 | * | 10/2003 | Dombrowski et al. | 49/340 |
| 2001/0008057 | A1 | * | 7/2001 | Sakaue et al. | 296/146.8 |
| 2003/0146644 | A1 | * | 8/2003 | Sakai et al. | 296/146.8 |

* cited by examiner

*Primary Examiner*—Kiran Patel
(74) *Attorney, Agent, or Firm*—Clark Hill PLC

(57) ABSTRACT

A liftgate force control assembly (20) adjusts the force required to move a liftgate (12) that is pivotally secured to a motor vehicle (10) using a hinge (14). The liftgate force control assembly includes a track (42) that is fixedly secured to the motor vehicle. A follower (46) is movably secured to the track. A strut (34, 36) has a movable end (26, 28) and a secured end (30, 32). The secured end (30, 32) is pivotally secured to the liftgate (12) and the movable end (26, 28) is pivotally secured to the follower (46). The strut (34, 36) defines a moment with respect to the hinge that secures the liftgate to the motor vehicle. A motor (50) is connected to the follower (46) to move the follower (46) along the track (42) changing the moment of the strut such that the force required to move the liftgate (12) changes as the moment changes.

12 Claims, 5 Drawing Sheets

FIG - 1
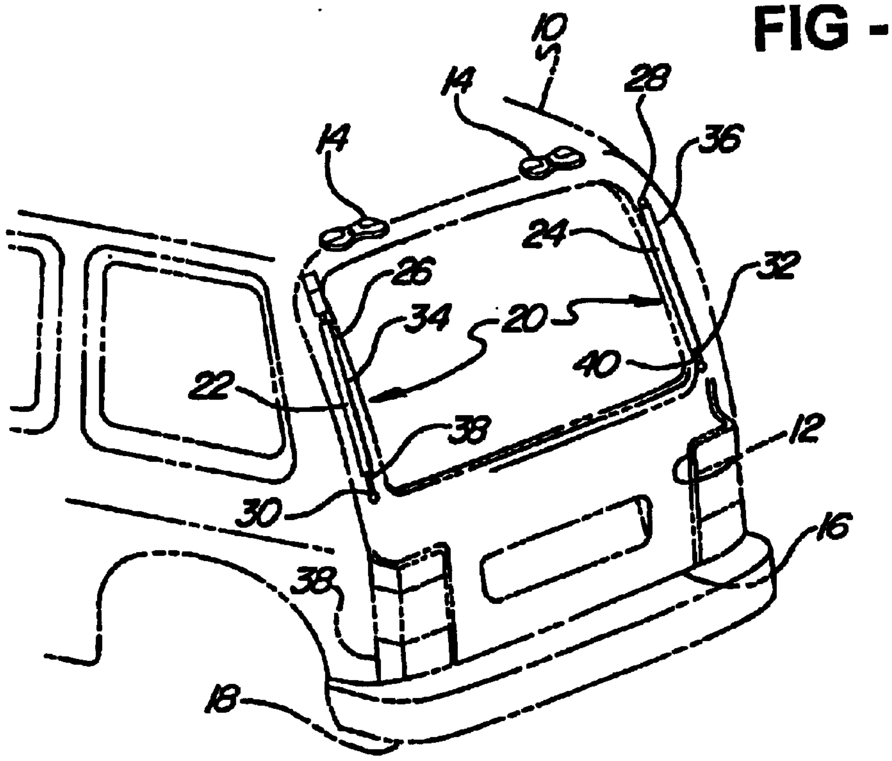
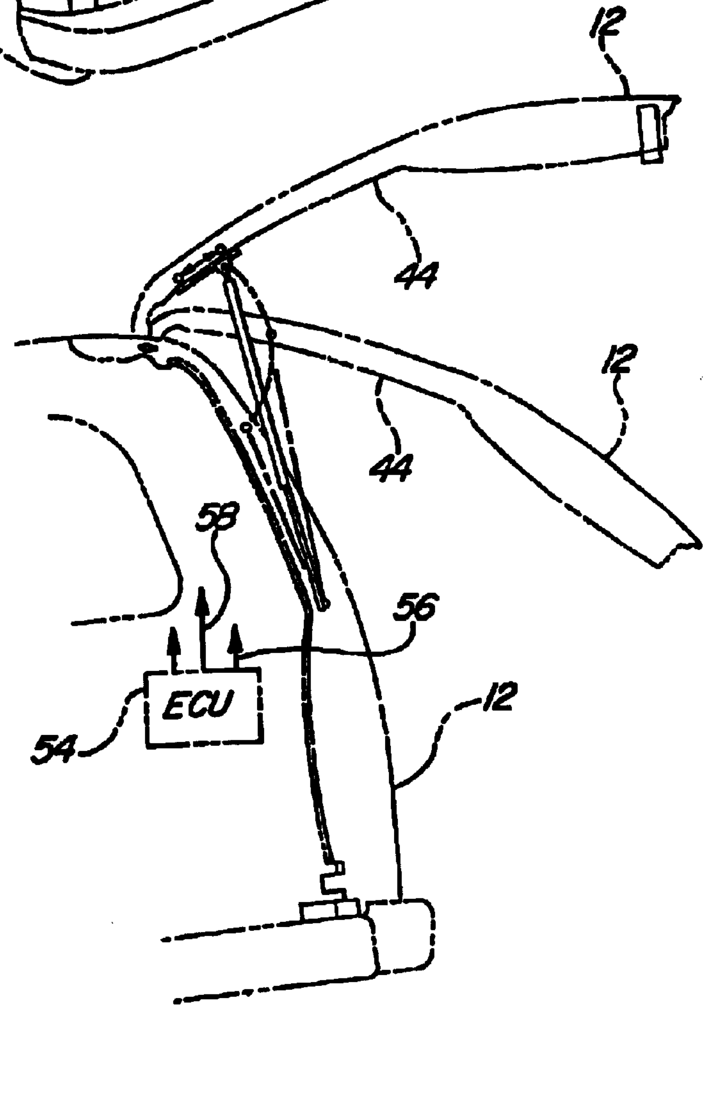
FIG - 2

FIG - 4
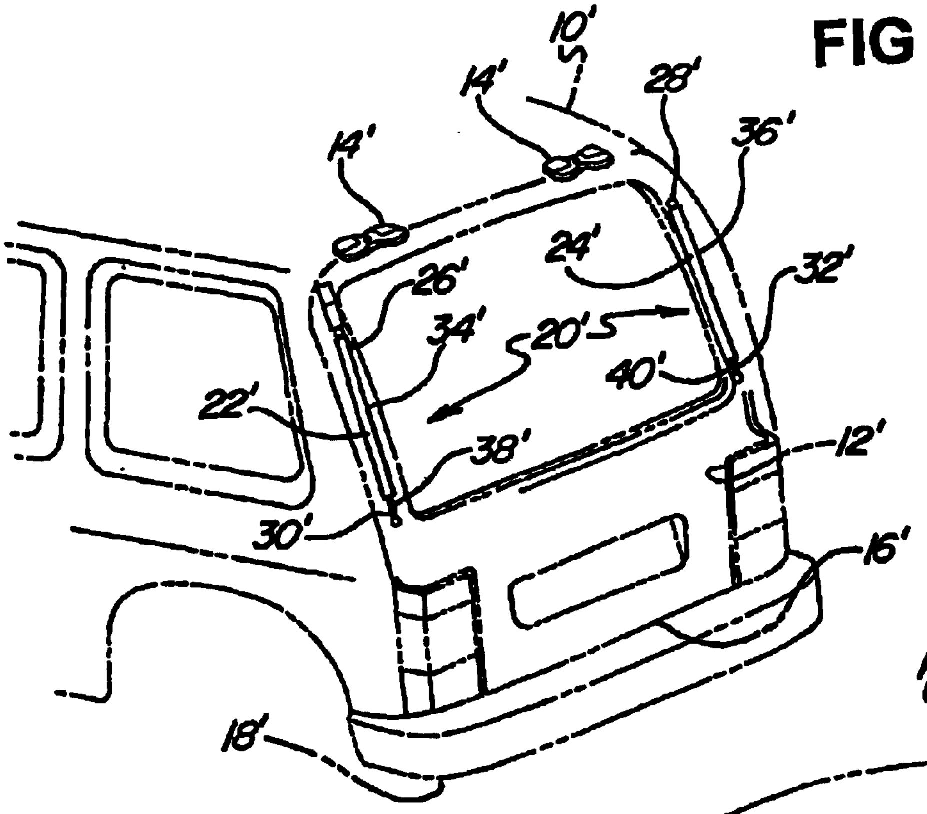
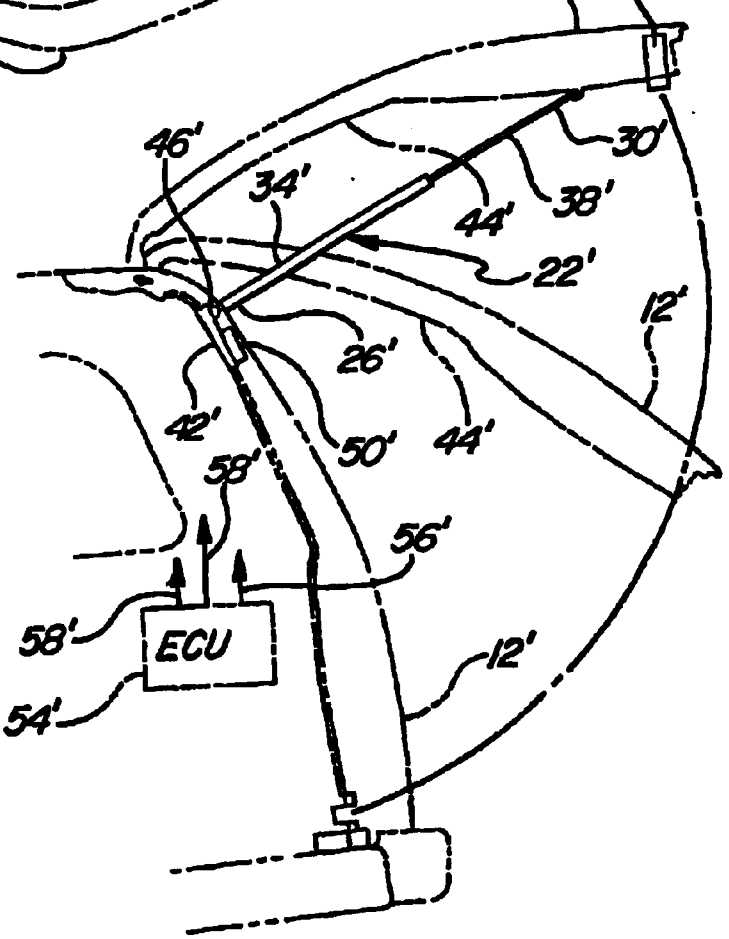
FIG - 5

LIFTGATE FORCE CONTROL

This application claims benefit to U.S. Provisional Application No. 60/236,978, dated Sep. 29, 2000.

FIELD OF THE INVENTION

The invention relates to a liftgate assembly having force assist struts. More specifically, the invention relates to a liftgate assembly having adjustable force assist struts.

DESCRIPTION OF THE RELATED ART

Liftgates for motor vehicles require counterbalancing. The counterbalance allows the operator thereof to lift the liftgate with a minimal of effort. Further, the counterbalance prevents the liftgate from falling after the liftgate has been opened. This avoids injury to the operator as the liftgate will not fall on him or her.

Struts are usually used as the counterbalance for the liftgate. The struts are pneumatic cylinders typically filled with a gas material. A rod extends out from the pneumatic cylinder whereas the pressure created by the gas within the pneumatic cylinder provides a force assist for two purposes.

The first purpose is to aid the user in lifting the liftgate to its open position. The liftgate, including a large windowpane, is heavy and many users of the liftgate would be challenged to fully open the liftgate. The struts utilize the gas pressure to force the liftgate upwardly to assist the user in raising the liftgate.

The second purpose for using struts is for maintaining the liftgate in an open position without requiring a latch or support member that needs to be released when closing the liftgate. The struts allow the users to access the cargo area easily without much effort.

A liftgate is normally over-counterbalanced to auto open beyond a neutral force zone at the closure position. When a liftgate latch releases, the user urges the liftgate through the neutral zone until the counterbalance acts to swing the liftgate fully open. And in closing the liftgate, the user must first pull down and then change hand position to push in overcoming the counterbalance bias.

There are disadvantages to using the struts for providing force assist for the liftgate. In many instances, the liftgate is raised by the struts to a position that is unreachable to those users who are not able to reach up to the fully open liftgate. These users must either tie tethers to the liftgate or find objects to step up to reach the fully open liftgate.

Another disadvantage to the strut lift assist is that there is little regulation as to the fully open position. The finish of the liftgate may be damaged when the liftgate is opened in a low clearance area, e.g., under an open garage door. If opening the liftgate in a low clearance area is done routinely, adjustment to the fully open position may be desirable.

Yet another disadvantage associated with the current arrangement of using struts to assist in forcing the liftgate to an open position is that it is temperature dependent. Because the gas pressure in the strut obeys the characteristics of an ideal gas, the strut's force is significantly dependent on ambient temperature. As the ambient temperature rises, so too does the temperature of the gas within the pneumatic cylinder of the strut. This increases the force that the strut is able to generate resulting in a liftgate that rises quickly and is more difficult to close. Likewise, as ambient temperature decreases, so too does the force that the strut is able to produce. This reduction of force may result in little or no force assisting requiring the user to provide a force equal to the weight of the liftgate and windowpane to open the liftgate.

SUMMARY OF THE INVENTION

According to one aspect of the invention, there is provided a liftgate force control assembly that adjusts the force required to move a liftgate that is pivotally secured to a motor vehicle. The liftgate force control assembly includes a track that is fixedly secured to the motor vehicle. A follower is movably secured to the track. A strut defines a moving end and a secured end. The secured end is pivotally secured to the liftgate and the moving end is pivotally secured to the follower. The strut defines a moment with respect to the hinge that secures the liftgate to the motor vehicle. A motor is connected to the follower. The motor moves the follower along the track changing the moment of the strut such that the force required to move the liftgate changes as the moment changes.

According to another aspect of the invention, there is provided a vehicle having a liftgate mounted thereon by hinges. The liftgate is pivotally movable to open and close an opening in the vehicle. A pair of struts is operably connected between the liftgate and the vehicle to effect a lifting force on the liftgate. Each of the struts is pivotally mounted at one end to one of the liftgate and the vehicle and slidably mounted for reciprocating movement at an opposite end to the other of the liftgate and the vehicle. The reciprocating movement changes a magnitude of the lifting force being transferred to the liftgate. A drive motor operably engages the slidable end of each of the struts and operable to effect the reciprocating movement.

BRIEF DESCRIPTION OF THE DRAWINGS

Advantages of the invention will be readily appreciated as the same becomes better understood by reference to the following detailed description when considered in connection with the accompanying drawings, wherein:

FIG. 1 is a perspective view of a first embodiment of the invention shown in a motor vehicle, partially cut away;

FIG. 2 is a side view, partially cut away of the first embodiment of the invention secured to a liftgate and a motor vehicle, partially cut away;

FIG. 4 is a perspective view of a second embodiment of the invention shown in a motor vehicle, partially cut away;

FIG. 5 is a side view, partially cut away of the second embodiment of the invention secured to a liftgate and a motor vehicle, partially cut away;

DETAILED DESCRIPTION OF THE PREFERRED EMBODIMENTS

Figure 3:
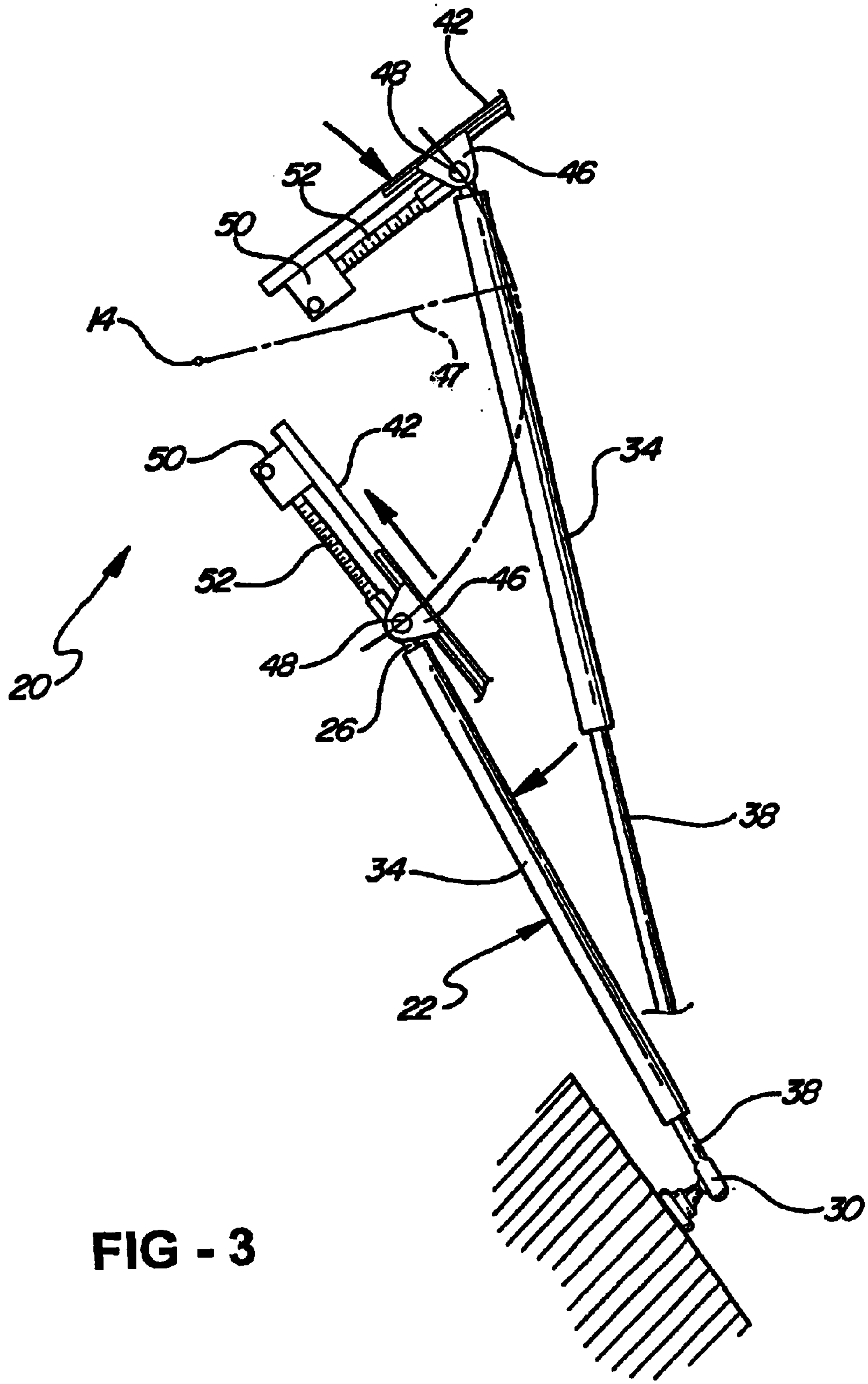
FIG. 3 is a schematic side view of a liftgate force assist strut in fully open and fully closed positions.

Referring to FIG. 1, a motor vehicle is shown at 10. The vehicle 10 includes a liftgate 12. The liftgate 12 is secured to motor vehicle 10 by two hinges 14. The liftgate 12 is in a closed position in FIG. 1. A bottom portion 16 of the liftgate 12 is latched to the motor vehicle 10 adjacent a bumper 18 using a latch 19 known in the art.

A power assist assembly is generally indicated at 20. The power assist assembly 20 includes two struts 22, 24. Each of the struts 22, 24 has a movable end 26, 28 and a secured end 30, 32, respectively, wherein the movable end 26, 28 is defined as the end that is connected to the movable liftgate 12 and the secured end 30, 32 is defined as the end connected to the motor vehicle 10. Each strut 22, 24 includes a gas cylinder 34, 36 and a rod 38, 40 that telescopes within the gas cylinder 34, 36. When the rod 38, 40 is retracted into the gas cylinder 34, 36, the liftgate 12 is in the closed position. When the rod 38, 40 fully extends out of the gas cylinder 34, 36, the liftgate 12 is in the open position, as a shown in phantom in FIG. 2.

With specific reference to the second strut 24, the movable end 28 and the secured end 32 are secured to the liftgate 12 and the motor vehicle 10 in standard fashion. More specifically, the movable end 28 is secured to the liftgate 12 without providing for lost motion therebetween. Likewise, the secured end 32 of the second strut 24 is secured to a D-pillar 39 of the motor vehicle 10 without providing for lost motion therebetween. The second strut 24 aids the operator in lifting the liftgate 12 by exerting of force thereon in an upward direction.

With reference to the first strut 22, the movable end 26 is secured to a power assist assembly 20. The secured end 30 is fixedly secured to the D-pillar 39 of the motor vehicle 10 in a standard or conventional fashion. More specifically, the secured end 30 is secured to the D-pillar 39 without providing for lost motion therebetween.

Referring to FIG. 3, the power assist assembly 20 is shown in two positions with respect to one of the two hinges 14. The power assist assembly 20 includes a track 42. The track 42 is fixedly secured to an inside surface 44 of the liftgate 12. It should be appreciated by those skilled in the art that the track 42 may be secured to the motor vehicle 10 effectively reversing the orientation of the power assist assembly 20 without adding an inventive element to the invention.

The track 42 provides a guide for a follower 46. The movable end 26 of the first strut 22 is connected to the follower or bracket 46. A pin 48 extends through the follower 46 and allows the movable end 26 to pivot with respect thereto.

A motor or actuator 50 is secured to the track 42 at one end thereof. The motor 50 is bidirectional and rotates a drive screw 52. The drive screw 52 is connected to the follower 46 through a drive nut (not shown). Therefore, when the motor 50 rotates the drive screw 52, the drive nut moves the follower 46 along the track 42 adjusting the moment arm 47 of the power assist assembly 20. The follower 46 moves back and forth along the track 42 depending on the direction of rotation of the drive screw 52.

Returning to FIG. 2, an electronic control unit 54 is shown in phantom. The electronic control unit 54 receives three inputs and provides an output. Two of the three inputs received by the electronic control unit 54 are the output of a sensor (not shown) identifying the position of the follower 46 and the output of a sensor (not shown) identifying ambient temperature. The output 56 of the electronic control unit 54 is sent to the motor 50. The output provides information to the motor 50 regarding the direction in which the motor 50 is to rotate and for how long. Depending on the temperature, the follower 46 will be moved along the track 42 to increase or decrease the moment arm 47 of the power assist assembly 20. The change in the moment arm 47 is required as a function of temperature because the gases found in the two struts 22, 24 are affected by temperature. More specifically, the assistance provided by the two struts 22, 24 decreases as the ambient temperature decreases. Likewise, the assistance provided by the two struts 22, 24 increases as the ambient temperature increases.

The electronic control unit 54 receives a third input 58. The third input 58 identifies the position of the liftgate 12. The electronic control unit 54 measures the amount of time required for the liftgate 12 to move between positions. Depending on the temperature and the position of the follower 46 in the track 42, the electronic control unit 54 measures the wear upon the struts 22, 24. Given identical temperatures and follower position, if the liftgate 12 moves between two arbitrary positions quicker than what it had in the past, electronic control unit 54 could identify gases leaving the struts 22, 24 reducing the effective power to assist thereby. The electronic control unit 54 then moves the follower 46 adjusting the moment arm 47 of the power assist assembly 20 to compensate for the leaking gases that might reduce the efficiency of the struts 22, 24.

Referring to FIGS. 4 and 5, wherein like primed numerals represent similar elements as those indicated in the first embodiment, a second embodiment 20' is shown. The second embodiment of the power assist assembly 20' differs from the first embodiment only in its orientation. More specifically, the power assist assembly 20' is secured to a D-pillar 39 of the motor vehicle 10' and not the liftgate 12'. In this embodiment, the movable end 26' is secured to the D-pillar 39' and the secured end 30' is secured to the liftgate 12'. This embodiment provides for more movement of the position of the movable end 26'. Greater movement translates into more control over more situations.

Figure 6:
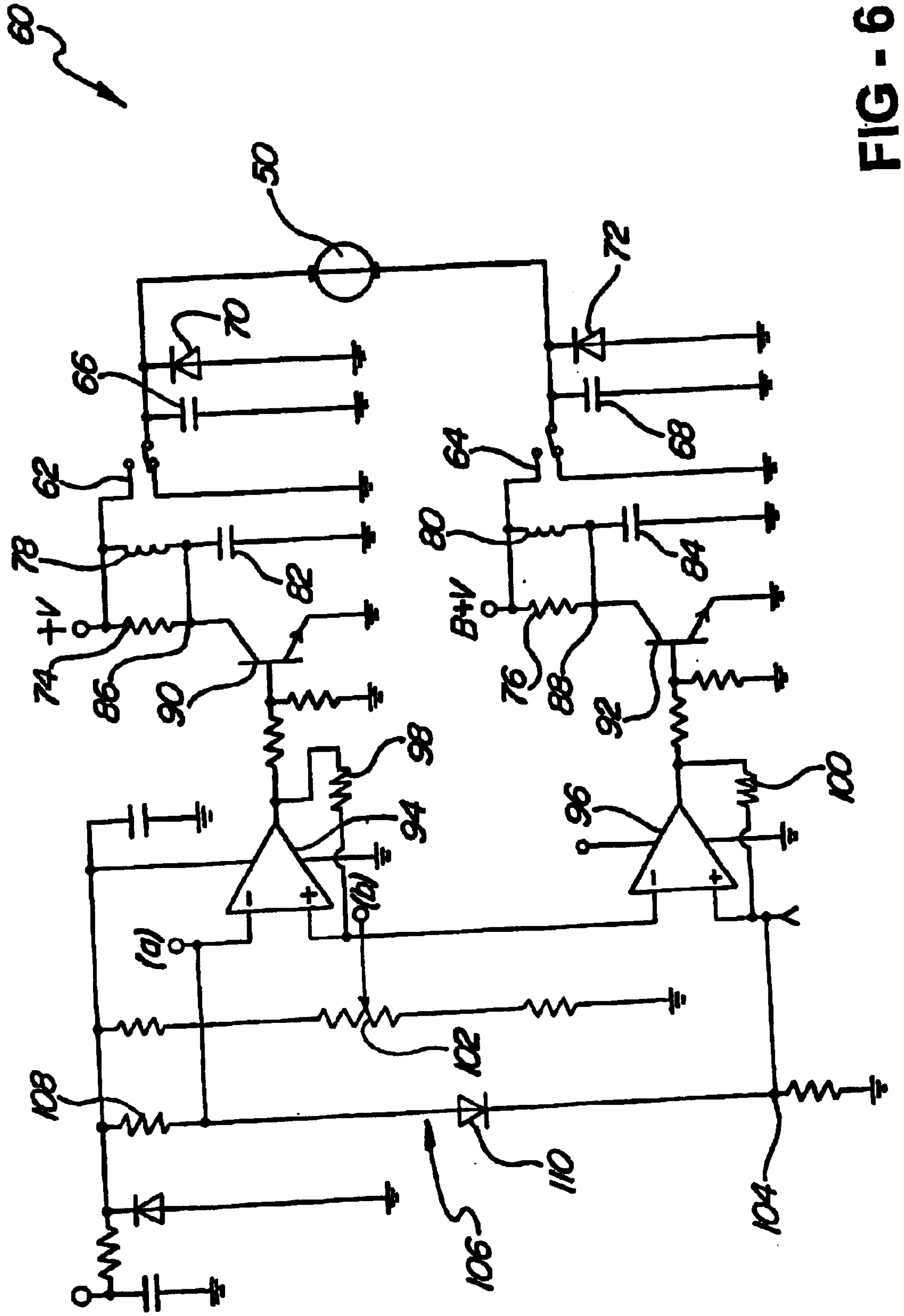
FIG. 6 is an electrical schematic of an electronic control for one embodiment of the invention.

Referring to FIG. 6, an electrical schematic of the invention 20 is generally indicated at 60. The circuit 60 supplies power to the motor 50 to drive it in either direction, clockwise or counterclockwise. The direction of rotation for the motor is based on the positions of two switches 62, 64. Both switches are single pole double throw switches 62, 64. Each of the switches 62, 64 are connected to one end of the motor 50 with a resistor 66, 68 and a capacitor 70, 72 connected in parallel therebetween, respectively. One end of each of the switches 62, 64 is also connected to power, a resistor 74, 76 and a capacitor 78, 80, which are, in turn, connected to a capacitor 82, 84, respectively. Each of these elements is all connected to a single terminal 86, 88.

Two transistors 90, 92 have their collector terminals connected to the terminals 86, 88. The transistors 90, 92 receive a signal from two comparators 94, 96. The comparators 94, 96 produce an output that drives the transistors 90, 92 to switch the switches 62, 64 to allow the motor 50 to drive in one direction or another.

Each of the comparators 94, 96 have a feedback resistor 98, 100. The feedback resistors 98, 100 are connected between the output of the comparators 94, 96 and the non-inverted input of the comparators 94, 96. The feedback resistors 98, 100 cause the motor 50 to slightly overshoot the target destination. This will avoid the nuisance of the constant adjustment of the liftgate force assist assembly 10.

A potentiometer 102 is operated by the drive screw 52. The potentiometer 102 adjusts the input to the non-inverting input of the first comparator 94 and the inverting input of the second comparator 96. This provides an indication as to where on the drive screw 52 the follower 46 is.

A thermistor 104 is used as a portion of a voltage divider, generally shown at 106, having a second resistor 108. The thermistor 104 is the temperature sensor that senses the ambient temperature of air at the location of the liftgate force control assembly 12. The voltage divider 106 is connected to the inverted input of the first comparator 94 and the non-inverted input of the second comparator 96. The voltage divider 106 also includes a diode 110. The diode 110 creates a null window between the first and second comparator reference points to provide a stable state for both comparators 94, 96 when they are in the off state.

Figure 7:
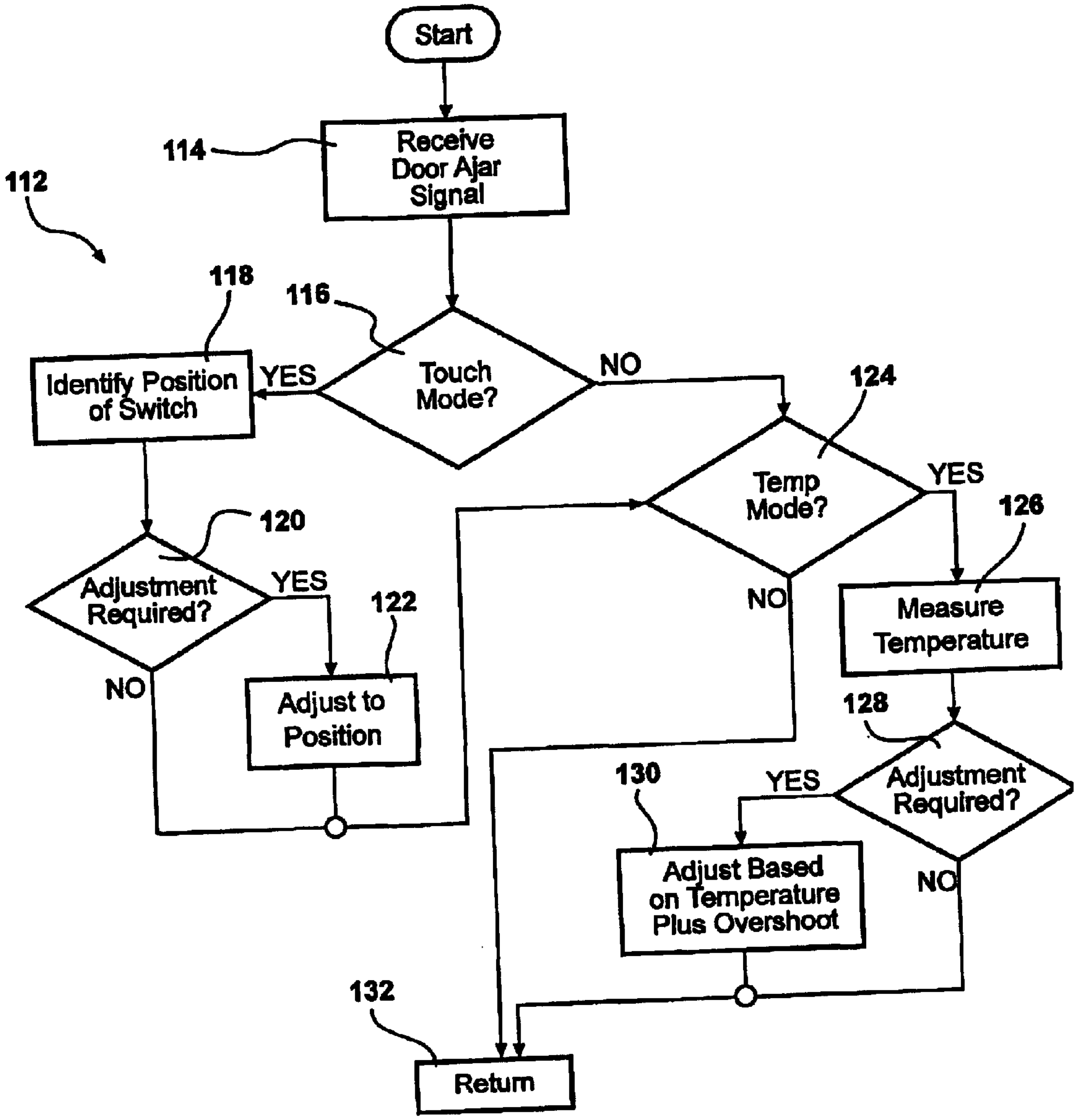
FIG. 7 is a logic chart of one embodiment of an inventive method for operating the invention.

Referring to FIG. 7, a method for operation is generally indicated at 112. The method 112 starts with receiving a door ajar signal at 114. The door ajar signal is typically initiated when the latch 19 is activated. The method 112 then identifies whether it is in touch mode at 116. Touch mode is when the user of the motor vehicle 10 determines the level of force assist is desired. More specifically, the user may determine that little force assist is necessary. This not only reduces the moment of the strut 22 but also may determine how high the liftgate 12 will rise automatically. This will aid those that cannot reach the highest open position the liftgate 12 is capable of reaching. It will also aid those that frequently open their liftgate 12 in a closed environment, e.g., in a garage under an open garage door.

If the method is operating in the touch mode, it identifies in what position an indicator switch (not shown) is at 118. It is then determined whether adjustment is required at 120. If so, the motor 50 rotates the drive screw 52 to move the follower 46 at 122.

Once the touch mode has been completed, it is determined whether the method should operate in a temperature mode at 124. If not, the method is terminated.

If the method is to operate in temperature mode, the temperature is measured at 126. Once measured, it is determined whether adjustment to the force is required at 128. More specifically, it is determined whether the pressure within the strut 24 has changed due to a change in temperature. If so, the position of the strut 24 is modified to return the strut 24 to providing the same force assist as it would have when the strut 24 operated in the temperature that it last recorded when the door ajar signal was received last.

If adjustment is to be made, it is done so at 130. To ensure continual adjustment due to fluctuations in temperature change does not occur, the feedback resistors 98, 100 allow the method 112 to overshoot the target temperature setting. Therefore, adjustment will not occur again until the temperature has changed to a degree that is represented by the last temperature reading plus an additional amount. The amount may be determined by a manufacturing setting or by a user of the motor vehicle 10.

Once the adjustment has occurred, the method is returned at 132 for the next time the door ajar signal is received. As may be seen with FIG. 7, the method 112 can be separated into two halves, the touch mode, starting at decision diamond 116 and the temperature mode, starting at decision diamond 124. These two halves operate independently of each other and, therefore, may be separated into separate embodiments for independent use.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A liftgate force control assembly for adjusting the force required to mov a liftgate pivotally secured to a motor vehicle by a hinge, said liftgate force control assembly comprising:

a strut having a moving end and a secured end, said secured end being pivotally secured to one of the liftgate and the vehicle and said moving end slidably secured to the other of the liftgate and the vehicle, said strut defining a moment with respect to the hinge;

a motor operably connected to the moving end, said motor effecting reciprocating movement of said moving end changing said moment of said strut such that a force required to move the liftgate changes as said moment changes;

an electronic control unit electrically connected to said motor for controlling said motor, said electronic control unit including a temperature sensor electrically connected to said electronic control unit for providing a temperature input signal of ambient temperature at said follower such that said electronic control unit changes the position of said moving and responsive to said temperature signal; and a manual switch electrically connected to said electronic control unit for providing a force level signal to said electronic control unit to manually adjust said moment of said strut wherein said force level is modified by said electronic control unit based upon said temperature input signal such that the liftgate moves based on said force level signal in a manner identical to when said manual switch was set.

2. A liftgate force control assembly as set forth in claim 1 wherein said moving end has a follower slidably engaging a track, said track having a channel for guiding said follower therealong.

3. A liftgate force control assembly as set forth in claim 2 including a drive screw extending through said track and threadably engaging said follower wherein said drive screw is driven by said motor and rotation of said drive screw drives said follower therealong.

4. A liftgate force control assembly as set forth in claim 3 wherein said moving end has a follower slidably engaging a track, said track having a channel for guiding said follower therealong.

5. A liftgate force control assembly as set forth in claim 4 including a drive screw extending through said track and threadably engaging said follower wherein said drive screw is driven by said motor and rotation of said drive screw drives said follower therealong.

6. A method adjusting a force required to move a liftgate secured to a motor vehicle by a hinge and supported by a strut connected between the motor vehicle at a connection position and the liftgate, the method comprises the steps of:

receiving a signal indicating the liftgate is unlatched;

receiving a signal generated by a manual switch indicative of a parameter for opening the liftgate;

measuring ambient temperature;

determining whether a condition for adjusting the force required to open the liftgate exists based on the signal from the manual switch and the ambient temperature; and adjusting the force required to open the liftgate by adjusting the connection position of the strut to the motor vehicle.

7. A method as set forth in claim 6 wherein the step of receiving a signal includes receiving a signal that the liftgate is ajar.

8. A method as set forth in claim 7 including the step of adjusting the connection position of the strut to the motor vehicle in a manner commensurate with the manual changes made to the switch.

9. A method as set forth in claim 8 including the step of generating a temperature signal for the measured ambient temperature.

10. A method as set forth in claim 9 wherein the step of adjusting the connection position between the strut and the motor vehicle when the temperature signal indicates a change in position is required to maintain the force required to move the liftgate constant.

11. A method as set forth in claim 10 including the step of moving the connection position beyond the position calculated using the temperature signal to prevent continuous adjustment of the connection position due to changes in measurements of the temperature to prevent continuous movement of the strut made by the motor.

12. A vehicle having a liftgate mounted thereon by hinges, said liftgate pivotally movable to open and clos an opening in said vehicle, a pair of struts operably connected between said liftgate and said vehicle to effect a lifting force on said liftgate, each of said struts pivotally mounted at one end to one of said liftgate and said vehicle and slidably mounted for reciprocating movement at an opposite end to the other of liftgate and said vehicle, said reciprocating movement changing a magnitude of said lifting force being transferred to said liftgate;

a drive motor operably engaging said slidable end of each of said struts and operable to effect said reciprocating movement;

an electronic control unit electrically connected to said motor for controlling said motor, said electronic control unit including a temperature sensor electrically connected to said electronic control unit for providing a temperature input signal of ambient temperature at said follower such that said electronic control unit changes the position of said moving and responsive to said temperature signal; and a manual switch electrically connected to said electronic control unit for providing a force level signal to said electronic control unit to manually adjust said moment of said strut wherein said force level is modified by said electronic control unit based upon said temperature input signal such that the liftgate moves based on said force level signal in a manner identical to when said manual switch was set.

* * * * *